Feb. 14, 1961 J. A. ROCCA 2,971,528
CONTROLLING APPARATUS FOR THE BRAKE HOSE LINE OF TRUCKS
Filed Sept. 19, 1958 2 Sheets-Sheet 1
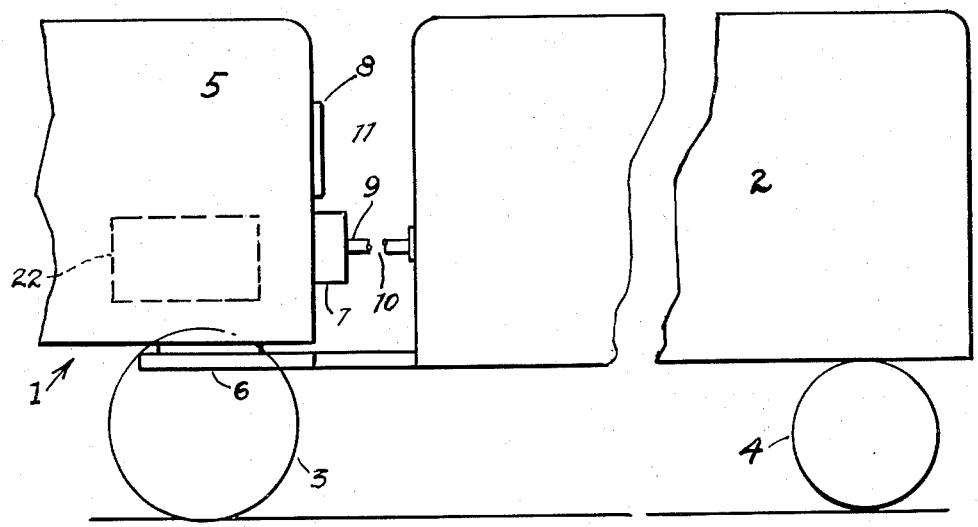
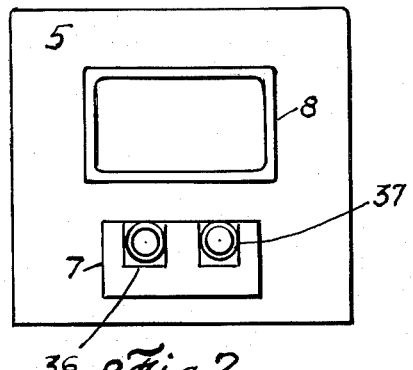
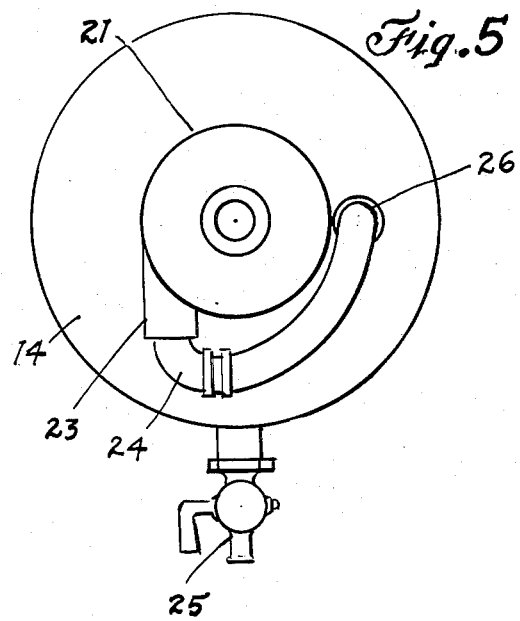
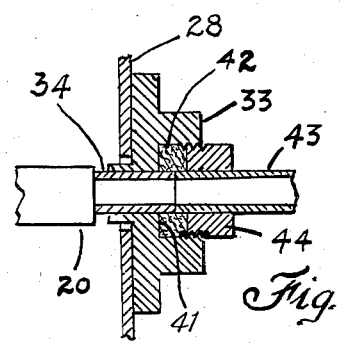
INVENTOR.
JOHN A ROCCA
BY
William F. Nickel
ATTORNEY

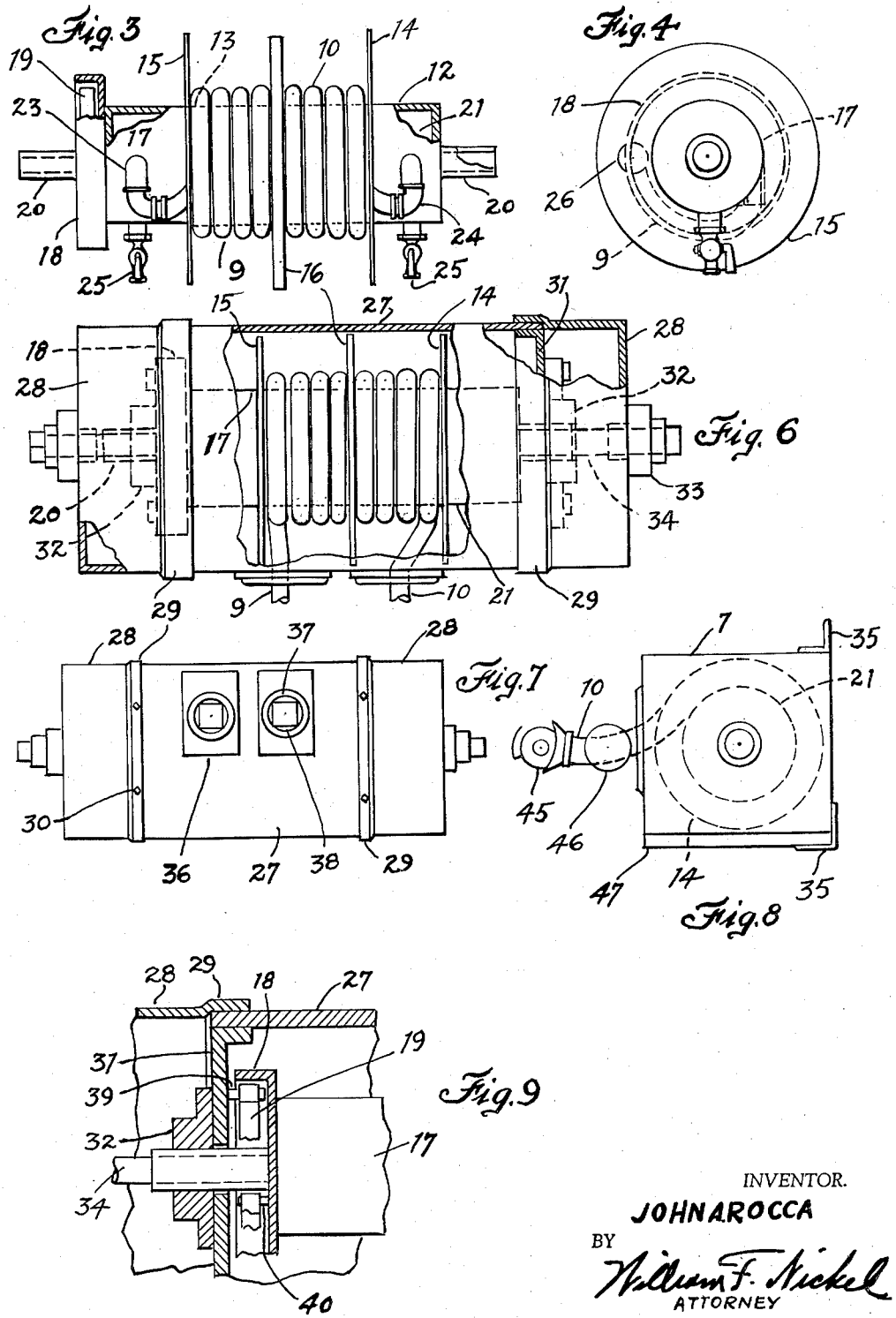

United States Patent Office 2,971,528
Patented Feb. 14, 1961

2,971,528

CONTROLLING APPARATUS FOR THE BRAKE HOSE LINE OF TRUCKS

John A. Rocca, 709 15th St., Union City, N.J.

Filed Sept. 19, 1958, Ser. No. 762,114

2 Claims. (Cl. 137—355.12)

My invention is an apparatus for movably supporting flexible conduits adapted to transmit fluid under pressure; especially hose lines that are in a required location between the compressed air reservoir of a motor truck and the devices for operating the brakes of the vehicle.

The primary object of this invention is to provide equipment that can be easily mounted on a truck and is so constructed that it yieldably and retractably engages exterior hose lines through which air under pressure is supplied to the mechanism for actuating the brakes by which the wheels of the truck are checked, stopped and released.

Another object is to provide equipment to serve such a purpose comprising a rotary drum for carrying the air hose of a truck; and designed to pay out the hose when the length thereof should be increased, and at other times to wind up the hose thereon to prevent slackness in the line, and thus obviate all risk of damage to the hose and injury to human beings.

My improvement is intended primarily for use on trucks comprising a tractor in front and a trailer in the rear, pivotally connected to the back of the tractor, to control the air hose extending through the space between the rear of the tractor and the front of the trailer. Hose in such positions on present-day trucks is generally not of constant length, but hangs more or less loosely, so as to allow for variations in the size of said space, as the tractor is turned to right or left in steering.

It is well known that in the operation of trucks comprising tractors and trailers, short turns must often be made, and the tractor is thus turned at a large angle to the trailer, especially when the truck is backed into position to load or unload in narrow streets and warehouse alleys. Such movements of the tractor and trailer always subject the connecting hoses to great stress, often causes fouling, snagging or tangling with the pivot coupling at the front of the trailer, scuffing and tearing of the hose, and much deterioration due to weather. These mishaps entail great loss of time and outlay in money and labor, and often result in serious accidents to individuals.

The end and aim of my invention is to obviate all the disadvantages and risks above-mentioned, and to protect the air hose lines of trucks, so as to ensure safe use and a great increase in the life and utility thereof.

These and other objects and the advantages of the invention are made clear in the following description, and the novel characteristics are pointed out in the appended claims. The drawings illustrate a preferred embodiment of the invention, but I do not wish to be limited to the exact structural details of the installation herein set forth. The particular construction detailed herein can, of course, be varied in many respects with departure or deviation from the principles which characterize the invention.

On the drawings:

Figure 1 is a diagrammatic view showing the rear part of a tractor and the front part of a trailer with my apparatus mounted on the tractor.

Figure 2 is a rear view of the tractor and the housing for the equipment I have invented mounted thereon.

Figure 3 is a side view of a rotary member for carrying the hose lines.

Figure 4 is an end view seen from the right of Figure 3.

Figure 5 is a similar view seen from the left of Figure 3, on a larger scale.

Figure 6 is a top view of a housing for the apparatus showing in general the arrangement of said apparatus therein.

Figure 7 is a front view of the housing.

Figure 8 is an end view thereof.

Figures 9 and 10 show sectional details.

In Figure 1, I indicate a truck comprising a tractor in front, part of which is indicated at 1, and a trailer 2 behind the tractor. The tractor has four wheels, two at each side, one being indicated at 3; and the trailer has two wheels, one at each side on the rear end, one indicated at 4. The two front wheels of the tractor are used for steering and the tractor also carries the engine (not shown) for propelling the truck and the cab 5 housing the seat of the driver. The pivotal connection or "fifth wheel" connecting the front of the truck to the rear of the tractor is indicated at 6, and a housing for my invention is shown at 7, affixed in a suitable location to the rear wall of the tractor, for example, just below the rear window at 8. The housing 7 has two hose lines 9 and 10 projecting therefrom, both extending back into the trailer for operation with the brakes of the truck. The hose line 9 extends to the emergency outlet of the brake system for the rear wheels 4 only, and the hose 10 runs to the regular service outlet for all the brakes on the tractor and trailer together.

The space 11 between the cab on the tractor 1 and the trailer 2 is of varying length on different trucks, but always as the tractor veers in steering, one side of this space becomes longer and the opposite side becomes shorter. These alterations in the distance between each side of the tractor and the adjacent side of the trailer have up to now compelled the builder to hang the parts of the brake hose lines that run through this space 11 from cab to trailer in a loose or slack condition, to prevent said parts from being pulled out too much and straightened or tautened; and thus obviate the risk of damage by tearing the hose, stressing it at the couplings, etc. Also, when hanging loose, the hose may catch on an obstruction, although the tractor and trailer may be in straight alinement. The axis of the fifth wheel 6 is usually forward of the outside surface of the rear of the cab 5; hence the space 11 may always change, but little in length at the longitudinal center of the track; but will become smaller at one side and longer on the other side, as the tractor is turned or the trailer swerves laterally. In any event, the hose lines in this space must be arranged to hang loosely on the conventional truck, because the space enclosing them is apt to be temporarily lengthened at one side or the other, to avoid being tautened and ripped or otherwise impaired.

The apparatus comprises a hollow rotary drum or member 12 having a central section 13 on which the two separate lengths of hose 9 and 10 are wound. This section 13 is generally cylindrical and it has projecting flanges or rims 14 and 15 encircling the ends and an encircling rim 16 in the middle. The section thus constitutes a pair of reels connected to each other, end to end, with a length of hose wound on each; one of the hoses being disposed on the reel between the middle rim 16 and the rim 14 at the right, and the other hose being disposed on the other reel between the middle rim 16 and the opposite rim 15. The hose 10 is intended to supply air for the over-all operation of the brakes, and the hose 9 transmits air when emergency braking is required, as at the wheels on the rear of the trailer 4.

At the opposite end of each winding reel for the hoses, adjacent the flanges 14 and 15, is an air chamber which is an integral part of the apparatus; and at the outer end of one of the air chambers 17 is a casing 18 containing a spring 19, and from the casing 18 projects a hollow boss or trunnion 20. The other chamber 21 at the opposite end of the apparatus also has a similar hollow boss or trunnion; and air is supplied to these chambers through the ducts in these bosses by air lines connected thereto and extending to a compressed air reservoir indicated at 22 on the tractor 1. Each chamber has an outlet 23 with a gooseneck coupling 24. One end of the hose 9 is connected to one of these goosenecks and an end of the other hose is connected to the other gooseneck, so that each of the hoses on the reels is joined to the adjacent chamber and receives air under pressure therefrom. Each chamber is also provided with a draincock 25 to evacuate any condensation in the air chambers.

The hoses on the reels each have one end passing through an opening 26 in the adjacent rims 14 and 15; so that air from the compression reservoir 22 flowing into the chambers 17 and 21 can be fed to either of the hose lines whenever the proper valves on the tractor are actuated by the driver; and the brakes with which the hoses 9 and 10 are in communication are to be operated.

The rotary member 12 is disposed in a housing 7 which is secured for example to the middle of the rear wall or at any other convenient location on the tractor cab 5, this housing comprising a central section 27 and two end sections 28. The central section is about as long as the rotary member except for the bosses 20, and the end sections have enlarged projecting rims 29 which envelop the terminal edges of the middle section and are removably secured thereto by bolts 30. The section 27 has closed ends 31 carrying standard bearings 32 in which the bosses or trunnions 20 are rotatably engaged, so that the member 12 can turn on these bosses as trunnions or journals. The outer ends of the sections 28 are also closed, and in these ends are affixed couplings 33 for connection to the conduits that run to the air reservoir 22. In each trunnion 20 is a fixed nipple 34 that extends into the bore of the adjacent coupling 33, so that while the member 12 turns to pay out the hoses thereon or pull them back, communications between the air chambers and the air lines at the couplings 33 is constantly maintained. The ends of the nipples 34 in the couplings 33, are engaged in said couplings by suitable packing elements, so that, as the member 12 turns, the nipples also turn, but leakage is prevented.

The housing 7 is secured in an opening of the wall at the rear of the tractor 1 by means of brackets and bolts indicated at 35 or any other suitable means. One face of the housing may project a short distance beyond the rear wall of the tractor and attached to this face is a pair of panels 36 having openings 37 through which the hoses can be moved. These openings may carry antifriction devices around their inner edges as indicated at 38 so that as the hoses move in and out of the housing, they are protected against wear and damage.

The hose lines 9 and 10 running from this housing are united by couplings 45 to conduits that pass through suitable openings in the trailer and are connected in the usual way to the conduits leading to the brake mechanism. Obviously as the tractor is turned and the space at one side or the other of the coupling 6 is increased, the hose adjacent that side is then pulled out against the tension of the spring 19 in the casing 18, and when the tractor and trailer are again swung into a straight line, that hose is wound up on the drum or member 12 without damaging stresses being imposed upon it. All risk of the hoses being pulled loose from their couplings, or fouled with the pivot of the trailer, or torn, or scuffed is obviated. The slack is always taken up by the spring 19 in the casing 18, the hoses never hang loosely between the tractor and the trailer, but are always snug in the housing 7; and the portions of the hose between the housing 7 and the trailer are never longer than the distances between one end of the housing 7 and the adjacent portion of the trailer which is behind this end.

Figure 9 shows one way of constructing the housing 7, with the mid-section 27 and end sections 28. The rims 29 of the end sections 28 surround the ends of the mid-section and can be secured as above stated by bolts 30. The partitions 31 at the ends of the mid-section 27 can be attached in any suitable manner. One of these partitions has a pin 39 to which one extremity of the spring 19 in the housing 18 is secured, and the housing 18 has a pin 40 to which the other end of the spring is affixed. The pins and spring are so arranged that when the houses 9 and 10 are pulled out, the spring is wound up, and retracts the hoses as soon as the pull thereon ceases. The structural details can of course be altered.

The couplings for the hollow bosses 20, so that these bosses can rotate therein, can be of any standard design, one example of which is indicated diagrammatically in Figure 10. One bushing 33 of this coupling is affixed to the outside of each end section 28, and has in its outer end a recess with a seat or shoulder 41 in which is a packing 42. The nipple 34 in the bore of each trunnion 20 passes through apertures in the end of sections 28 and in the bushing, beyond the seat or shoulder 41, and is surrounded by the packing 42. The supply pipe 43 for the compressed air carries a nut 44 and is inserted into the packing 42 to abut the nipple 34. When the nut 44 is screwed up the packing 42 seals the joint between the conduit 43 and the nipple 34.

Each of the hoses 9 and 10 has a coupling 45 to connect with the conduits in the trailer 2, and each of these hoses bears a ball 46 to serve as a stop when the hose is retracted so as to pull the ball against the panels 36.

The bottom of the housing 7 has a removable closure indicated at 47 in Figure 8. This closure may be hinged or may be arranged to slide in endwise or sidewise to open the bottom and give access to the interior of the housing 7.

The apparatus, of course, will work equally well if other pressure fluids than air are utilized.

My invention, though shown as attached in horizontal position to the tractor, can also be mounted with the housing and axis of rotation vertical, and it will again operate as required.

Having described my invention, what I believe to be new is:

1. Apparatus for controlling exposed flexible conduits to supply pressure fluid to the brakes of a truck comprising a trailer and a tractor, said apparatus including a hollow rotary member having a hollow trunnion at each end, said member containing a chamber for said fluid at each end thereof, said member also having a central portion between said chambers, exterior flanges on said central portion, another flange between said flanges, the spaces between said flanges forming a pair of reels, a hose wound upon each of said reels, each of said hoses having one end connected to the member and in communication with one of said chambers, a casing at one end of said member containing a spiral spring secured at one end to said casing, a housing having a central section containing said member and casing, the ends of said section being closed and having bearings, terminal sections secured to the ends of the central section, the casing containing said spring being adjacent one end of the central section, a stud attached to said end to which the other end of said spring is secured, couplings in the terminal sections, nipples within the trunnions received by said couplings, said housing having openings through which the opposite ends of the hose may be drawn, said member by reason of said nipples and said couplings being rotatably mounted in said housing.

2. Apparatus for controlling the exposed flexible conduits to supply pressure fluid to the brakes of a truck comprising a trailer and a tractor, said apparatus including a hollow rotary member having a hollow trunnion at each end, retaining means on said member between the trunnions, the spaces between said means forming a pair of reels, a hose wound upon each of said reels, each of said hoses having one end in communication with the interior of said member, spring means secured at one end to said member, a housing having a central section containing said member, the ends of said section being closed and having bearings for said trunnions, terminal sections at the ends of the central section, a stud attached to said housing to which the other end of said spring means is secured, couplings in the terminal sections and nipples within the trunnions received by said couplings, said housing having openings through which the opposite ends of the hose may be drawn, said member by reason of said nipples and said couplings being rotatably mounted in said housing.

References Cited in the file of this patent

UNITED STATES PATENTS

| | | |
|---|---|---|
| 203,647 | Raoul | May 14, 1878 |
| 1,914,654 | Tornblom | June 20, 1933 |
| 2,380,765 | Keith | July 31, 1945 |
| 2,856,016 | Lindeman | Oct. 14, 1958 |